UNITED STATES PATENT OFFICE.

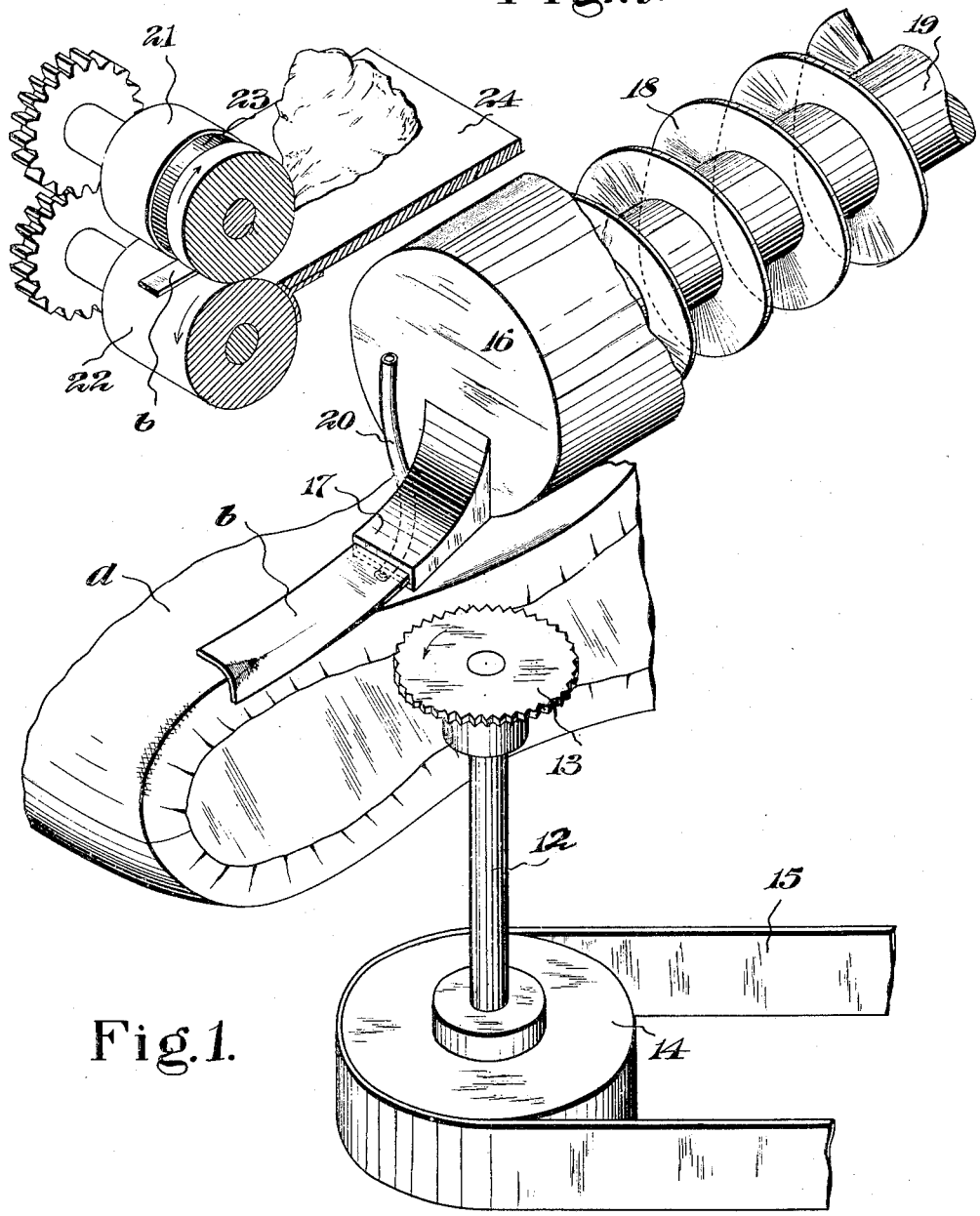

LOUIS A. CASGRAIN, OF BEVERLY, MASSACHUSETTS, ASSIGNOR TO UNITED SHOE MACHINERY CORPORATION, OF PATERSON, NEW JERSEY, A CORPORATION OF NEW JERSEY.

MANUFACTURE OF RUBBER FOOTWEAR.

1,363,308.  Specification of Letters Patent.  Patented Dec. 28, 1920.

Application filed April 14, 1919. Serial No. 290,041.

*To all whom it may concern:*

Be it known that I, LOUIS A. CASGRAIN, a citizen of the United States, residing at Beverly, in the county of Essex and State of Massachusetts, have invented certain Improvements in the Manufacture of Rubber Footwear, of which the following description, in connection with the accompanying drawings, is a specification, like reference characters on the drawings indicating like parts in the several figures.

This invention relates to the manufacture of rubber footwear such as tennis shoes, sneakers, arctics, and the like. The invention is herein set forth with particular reference to the application of foxing such as is employed as an intermediate strip between the edges of the soles and the edges of the uppers of such shoes.

So far as I am aware, the placing of the foxing has always been effected by hand, requiring the preliminary application of cement to the shoe upper while on the last, and then a careful laying of a strip of material suitable for foxing upon the cement and the running of a roller along the foxing to insure its proper contact with the cement in order that the later vulcanizing operation may effect a secure and completely waterproof joint. In the practice of the method referred to, it is further necessary to prepare the foxing by first forming the rubber compound into a sheet and then slitting it to form strips, this necessarily requiring the use of a machine for manufacturing the sheet and also requiring an operation of stripping the sheet and then laying the strips between protecting sheets in order that the rubber may not become "dry cured."

An important object of the present invention is to avoid the time and expense involved in the preliminary forming of the sheet of rubber compound as well as the necessity of converting the sheets into strips and of protecting the strips until such time as they are to be applied.

With this object in view, this invention in one aspect comprises the formation of a foxing strip of proper width and thickness and its immediate application to the shoe.

As herein exemplified, the foxing is produced as by forcing plastic material through a die or former, and the resultant strip is immediately directed into final position in the shoe as it is formed. To insure even laying of the strip, the shoe is preferably advanced at a speed different from the speed at which the strip is formed, for example, at a higher speed so as to keep the strip under tension.

In the accompanying drawings,

Figure 1 is a perspective view of so much of one embodiment of the machine as is necessary to illustrate the invention, including the method of operation.

Fig. 2 is a sectional perspective view of a different type of foxing strip former.

I have not attempted to illustrate the complete machine, including an entire frame therefor as such may be of any suitable construction, said frame (referring first to Fig. 1) providing a bearing for a shaft 12 having a combined guide and feed wheel 13 and a pulley 14 which may be driven in any suitable manner as by a belt 15.

Suitably supported by the frame of the machine is a hopper 16 from which a forming die or nozzle 17 leads in close proximity to the feed wheel so that the rubber compound which may be of any suitable or preferred ingredients placed in the hopper 16 or other source of supply and subjected to pressure to force the compound through the die or nozzle 17 will immediately form and lay upon the proper portion of a lasted shoe indicated at *a* a strip *b* serving all the purpose of the usual hand applied foxing.

The means for forcing the compound through the former 17 in Fig. 1 may be a spiral wing 18 carried by a shaft 19 which will be rotated in the proper direction to effect the result of a screw feed.

Of course the lasted shoe *a* may have cement applied in the usual manner, but I have demonstrated that by the application of a small quantity of gasolene to the shoe, the foxing will sufficiently adhere to the upper without the employment of cement. I have therefore indicated at 20 a tube through which a small quantity of gasolene or other suitable fluid may be supplied to the shoe at a point just in advance of the point where the strip of foxing from the former 17 is laid upon the shoe.

Any suitable foxing strip former may be employed in place of the one shown in Fig. 1. For instance, I may employ a pair of contacting rolls 21, 22 (Fig. 2) driven in the direction of the arrows by any suitable mechanism, one of said rolls having a peripheral groove 23. A shelf 24 is mounted to supply rubber compound to the rolls so that a strip $b$ is formed and forced out by the rolls, said strip having a uniform width and thickness determined by the width and depth of groove 23.

In order that the strip of foxing may be laid smoothly in place, it is desirable that the rate of movement of the shoe past the die or nozzle, and the rate at which the compound issues in the form of a strip shall be different. To provide for this I preferably rotate the feed wheel so as to advance the shoe at a rate slightly greater than that at which the foxing strip issues from the former, thereby keeping the strip under just sufficient tension to insure its being laid smoothly upon the shoe.

It is to be understood that any suitable means may be employed, if desirable, to press the strip of foxing upon the shoe after it has been laid in place in the manner which has been described.

It is also to be understood that by the term "shoe" used herein and in the claims, I do not intend to limit myself to any particular shape, size or style of footwear.

Of course, the material in the hopper or other source of supply 16 is any vulcanizable compound suitable for providing the foxing and if desired, cement may be introduced through the tube 20 instead of gasolene.

The novel method of producing the foxing as an article of manufacture independently of its application to the shoe, and the novel foxing herein disclosed, are not herein claimed, but form the subject-matter of my co-pending application Serial No. 288,230, filed April 7, 1919.

Having thus described the invention, what is claimed as new and desired to be secured by Letters Patent of the United States is:—

1. In the manufacture of rubber footwear, the method of converting a mass of plastic material into a strip, directing said strip on to a shoe as it is formed, and advancing the shoe at a speed different from that at which the strip is formed.

2. In the manufacture of rubber footwear, the method of converting a mass of plastic material into a strip, directing said strip on to a shoe part as the strip is formed, and advancing the shoe part while the strip is supplied thereto.

3. In the manufacture of rubber footwear, the method of producing a shoe having an applied foxing, which method comprises forming a strip of foxing and applying the foxing to the shoe as it is formed.

4. In the manufacture of rubber footwear, the method of producing a shoe having an applied foxing, said method consisting in forcing a rubber compound through a die or former directly into final position in the shoe.

5. In the manufacture of rubber footwear, the method of converting a mass of plastic material into a strip, directing said strip on to a shoe as it is formed and advancing the shoe at a speed exceeding the speed of exudation of the compound to insure even laying of the foxing.

6. In the manufacture of rubber footwear, the method of producing a shoe having an applied foxing, which method comprises forming a strip of foxing, applying the foxing to the shoe and treating the foxing with a solvent to effect adhesion of the foxing as it is applied.

7. Means for supplying a lasted shoe with a strip of adhesive plastic material comprising a strip former, means for forcing said material through said former on to a shoe, and means for advancing the shoe at a rate of speed different from that at which the strip is formed.

8. Means for supplying a lasted shoe with a strip of adhesive plastic material, comprising a strip former, means for forcing said material through said former on to a shoe, and means for advancing the shoe and maintaining the strip under tension as the shoe is advanced.

9. Means for effecting the smooth laying of adhesive plastic material on a piece of work, comprising a strip former, means for forcing said material through said former on to the work, and means for advancing the work at a speed different from that at which the plastic material issues from the former.

10. Means for supplying a lasted shoe with foxing, comprising a strip former, means for forcing a plastic material to form the foxing through said former, and a guide for the shoe in close relationship to said former.

11. Means for supplying a lasted shoe with foxing, comprising a strip former, means for forcing a plastic material to form the foxing through said former, a guide wheel for the shoe in close relationship to said former, and means for rotating said wheel to feed the shoe along at a speed to exert a drawing influence upon the material issuing from the former.

In testimony whereof I have signed my name to this specification.

LOUIS A. CASGRAIN.